(12) United States Patent
Kochsiek

(10) Patent No.: US 6,450,585 B1
(45) Date of Patent: Sep. 17, 2002

(54) WHEEL SUSPENSION ASSEMBLY

(75) Inventor: Guido Kochsiek, Leopoldshöhe (DE)

(73) Assignee: IPROTEC Maschinen-und Edelstahlprodukte GmbH (DE)

( * ) Notice: Subject to any disclaimer, the term of this patent is extended or adjusted under 35 U.S.C. 154(b) by 0 days.

(21) Appl. No.: 09/581,051

(22) PCT Filed: Dec. 2, 1998

(86) PCT No.: PCT/EP98/07839

§ 371 (c)(1),
(2), (4) Date: Aug. 3, 2000

(87) PCT Pub. No.: WO99/29521

PCT Pub. Date: Jun. 17, 1999

(30) Foreign Application Priority Data

Dec. 6, 1997 (EP) .............................. 97121489

(51) Int. Cl.[7] ..................... B60B 35/00; B60B 37/00; B60K 17/30; F16C 13/00; F16D 65/10

(52) U.S. Cl. .............. 301/124.1; 301/125; 301/132; 301/114; 180/258; 384/544; 188/218 XL

(58) Field of Search .................... 301/105.1, 125, 301/137, 131, 132, 124.1 I, 111, 114, 117; 295/36.1, 43; 180/258, 259, 257; 384/544; 403/25, 259, 260, 261; 188/17, 18 A, 18 R, 218 XL, 382

(56) References Cited

U.S. PATENT DOCUMENTS

| | | | | |
|---|---|---|---|---|
| 2,007,500 A | * | 7/1935 | McCauley ............... 188/152 |
| 4,340,317 A | | 7/1982 | Heitmann et al. |
| 4,433,877 A | * | 2/1984 | Colanzi .................. 308/191 |
| 4,493,388 A | * | 1/1985 | Welschof et al. .......... 180/258 |
| 4,784,441 A | * | 11/1988 | Welschof et al. ......... 301/124.1 |
| 4,858,998 A | * | 8/1989 | Welschof et al. ......... 301/124.1 |
| 5,454,454 A | * | 10/1995 | Easton et al. .......... 188/218 XL |
| 5,486,053 A | * | 1/1996 | Beagley et al. ........... 384/513 |
| 5,536,098 A | * | 7/1996 | Schwarzler .............. 403/259 |
| 5,549,514 A | * | 8/1996 | Welschof ............... 464/145 |
| 6,230,848 B1 | * | 5/2001 | Niebling et al. .......... 188/18 A |
| 2001/0012419 A1 | * | 8/2001 | Tajima et al. ............ 384/544 |

FOREIGN PATENT DOCUMENTS

| | | |
|---|---|---|
| EP | 0 126 607 A2 | 11/1984 |
| EP | 0 653 315 A1 | 5/1995 |
| GB | 168 142 A | 8/1921 |
| WO | WO 92/11474 | 7/1992 |

* cited by examiner

*Primary Examiner*—S. Joseph Morano
*Assistant Examiner*—Jason R. Bellinger
(74) *Attorney, Agent, or Firm*—Cantor Colburn LLP

(57) ABSTRACT

The invention relates to a wheel suspension for the driven wheels of a motor vehicle which are each fastened detachably by means of wheel bolts to a contact surface of a brake member which for its part is mounted rotatably by means of at least one roller bearing on a suspension connected in pivotable manner to the frame or structure of the vehicle and is connected to a drive shaft. In order to provide a structurally simple connection which is free of play both in the axial as well as in the radial direction the end of the drive shaft on the wheel side is connected via a shaft section having a polygonal outer contour directly to the brake member. Furthermore the drive shaft adjoining this polygonal shaft section is constructed with a cylindrical shaft section serving as the seat for the roller bearing.

11 Claims, 4 Drawing Sheets

WHEEL SUSPENSION ASSEMBLY

TECHNICAL FIELD

The invention relates to a wheel suspension for the driven wheels of a motor vehicle which are each fastened detachably by means of wheel bolts to a contact surface of a brake member, that is to say a brake drum or a brake disk, which for its part is mounted rotatably by means of at least one roller bearing on a suspension connected in pivotable manner to the frame or structure of the vehicle and is connected to a drive shaft.

BACKGROUND OF THE INVENTION

Such wheel suspensions for the driven wheels of a motor vehicle are known in various versions. When a constant-velocity joint for single wheel suspensions consisting of a ball cup, ball star and balls arranged in a ball cage is used, the ball cup in the known structures is provided with a pin moulded on in one piece to its base which serves as the wheel drive shaft and is connected in a manner fixed to rotation to a hub which is mounted rotatably via at least one roller bearing on a guide bar connected to the frame or the structure of the vehicle. The non-slipping connection between the hub and the pin moulded on the base of the ball cup ensues by means of axial channel toothing. Apart from high production costs, this channel toothing to be constructed both on the hub as well as on the pin of the ball cup has the disadvantage that in the radial direction it does not allow connection absolutely free of play between the two parts connected to one another in non-slipping manner. However, in view of the very high and dynamic loading at this point transmitting the driving torque even a small radial play in the region of the axial channel toothing results in undesired wear as well as undesired noise and vibrations.

SUMMARY OF THE INVENTION

The underlying aim of the invention is to provide a wheel suspension of the type described above for the driven wheels of a motor vehicle which while simultaneously having a simplified structure provides a connection between the drive shaft and the wheel fastened to the brake member which is absolutely free of play even in the radial direction, that is to say regardless of whether the brake member is a brake drum or a brake disk and whether the driven wheel is an unsteered rear wheel or a steerable front wheel.

The solution to this problem provided by the invention is characterised in that the end of the drive shaft on the wheel side is connected via a shaft section having a polygonal outer contour directly to the brake member and that the drive shaft adjoining this polygonal shaft section is constructed with a cylindrical shaft section serving as the seat for the roller bearing.

By means of this refinement according to the invention of the wheel suspension defined at the outset the hub needed hitherto and its non-slipping connection to the wheel drive shaft via axial channel toothing which does not allow any clear and absolutely play-free assignment in the radial direction are not required. The end of the drive shaft on the wheel side is connected via the shaft section with a polygonal outer contour directly to the brake member, this polygonal shaft section engaging in a correspondingly polygonal recess of the brake member with avoidance of any radial play. Since the drive shaft adjoining the polygonal shaft section is further constructed at its end on the wheel side with a cylindrical shaft section serving as a seat for the inner ring of the roller bearing the wheel hub used hitherto is not needed its function being taken over in part by the brake member and in part by the drive shaft. Thus overall a structurally simpler wheel suspension comprising fewer components is produced which due to the elimination of a hitherto unavoidable radial play on the power take-off side additionally has a considerably longer service life.

According to a preferred practical embodiment of the invention this wheel suspension finds application in single wheel suspensions in which the brake member is connected to the drive shaft by means of a constant-velocity joint consisting of a ball cup, ball star and balls arranged in a ball cage. In these wheel suspensions it is proposed that the end of the ball cup on the wheel side constructed as a wheel drive shaft is connected via a shaft section having a polygonal outer contour directly to the brake member. In this specific embodiment the cylindrical shaft section serving as seat for the roller bearing is constructed between the polygonal shaft section and the ball cup. In this embodiment also the advantage lies in the elimination of the wheel hub as well as the radial play in the region of the brake member/drive shaft.

According to a further characteristic of the invention the wheel drive shaft can be designed as a separate component and be connected via an end flange having a polygonal outer contour to the ball cup which is provided in its base with a recess corresponding to the polygonal outer contour of the end flange. This construction of the wheel drive shaft as a separate component and the connection free of play of this component to the ball cup affords the possibility of a further reduction in costs in the manufacture of the single wheel suspension according to the invention.

In a preferred embodiment of the invention the polygonal outer contour of the shaft section and/or the end flange of the wheel drive shaft is of conical construction in the axial direction so that in simple manner a connection of the wheel drive shaft to the brake member on the one hand and to the ball cup on the other hand which is free of play both in the axial as well as in the radial direction can be achieved.

According to a further characteristic of the invention the drive shaft or the wheel drive shaft is provided with a thread for a fastening member fixing the brake member on the drive shaft or the wheel drive shaft in the axial direction, the thread being preferably constructed as an inner thread for the threaded body of the fastening member constructed as a bolt, the bolt head of which rests against an annular contact surface of the brake member. This yields a very simple construction for the play-free and non-slipping connection of the brake member via the wheel drive shaft to the ball cup which according to the invention can be further developed in that at the same time the inner ring of the roller bearing is clamped by the fastening member between the end flange of the drive shaft or the wheel drive shaft and a contact surface.

In order to employ the bolt simultaneously as a tool for the assembly and disassembly of the brake member on the drive shaft or wheel drive shaft it is proposed by a further characteristic of the invention to provide the screw head with an inset key surface, in particular an inset hexagon, and to hold it in the brake member by means of a retaining member, for example a snap ring, so that it can rotate but is substantially undisplaceable in the axial direction. With the aid of a bolt held in position in this way on the brake member, the brake member and with it the roller bearing can not only be pushed on to the drive shaft but the brake member can also be pulled off the drive shaft without a special tool being necessary for this purpose.

The wheel suspension according to the invention is suitable not only for the driven rear wheels of a motor vehicle but also for the steerable front wheels of a motor vehicle equipped with front wheel drive. In the latter case both the ball cup as well as the ball star of the constant-velocity joint are constructed with arched ball races for the balls and the outer ring of the roller bearing is fixed in a steering knuckle which for its part is mounted on a guide rod so as to be pivotable by means of a steering mechanism.

Regardless of whether the wheel suspension according to the invention is a suspension for a driven rear wheel or for a driven steered front wheel the brake member can be constructed as a brake disk or as a brake drum.

An exemplified embodiment of the wheel suspension according to the invention is illustrated in the drawing which shows:

BRIEF DESCRIPTION OF THE DRAWINGS

An exemplified embodiment of the wheel suspension according to the invention is illustrated I the drawing which shows.

DETAILED DESCRIPTION OF THE INVENTION

Figure 1:
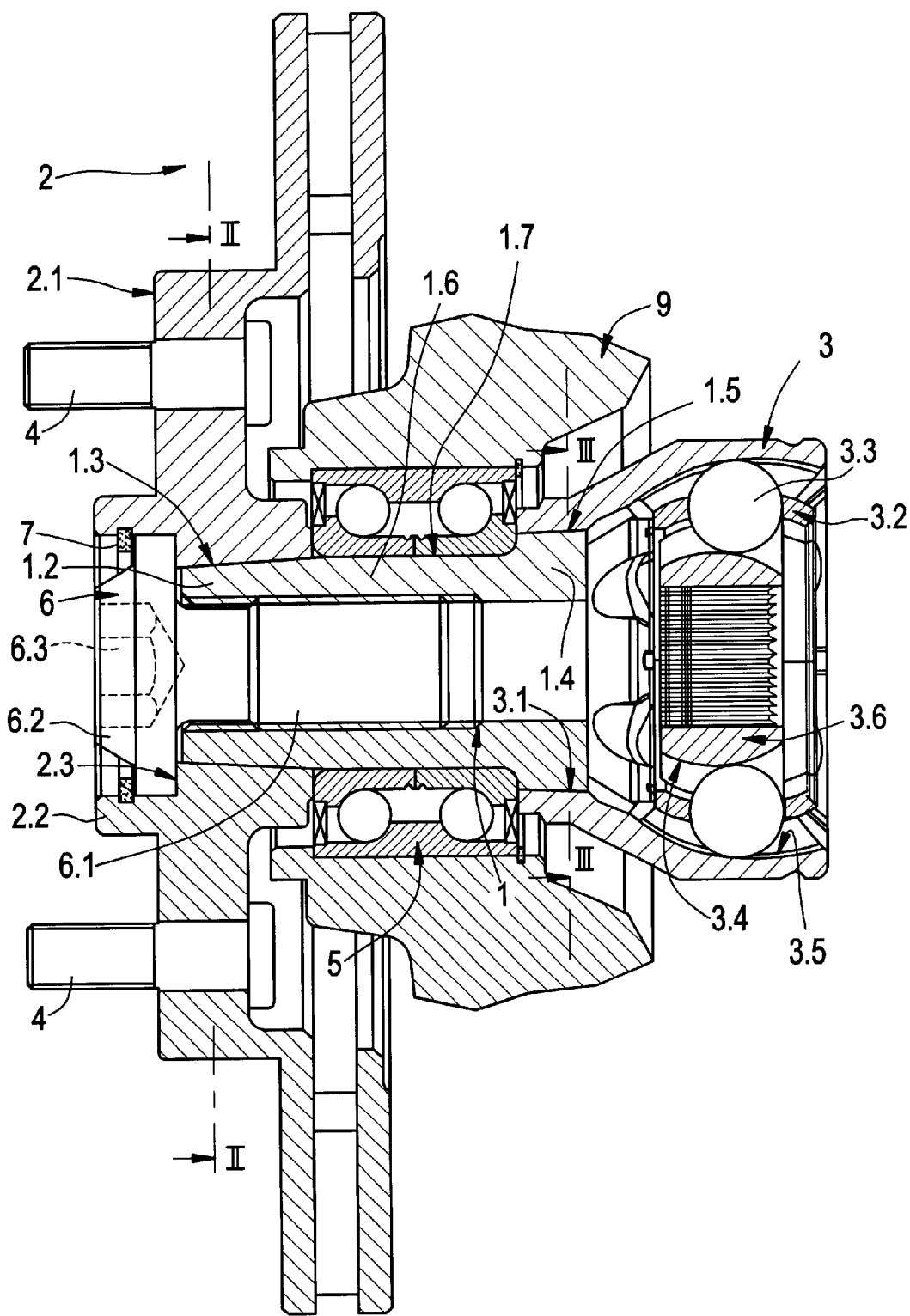
FIG. 1 a longitudinal section through a wheel drive shaft connected in a non-slipping manner to a brake member and a ball cup of a constant-velocity joint.
Figure 2:
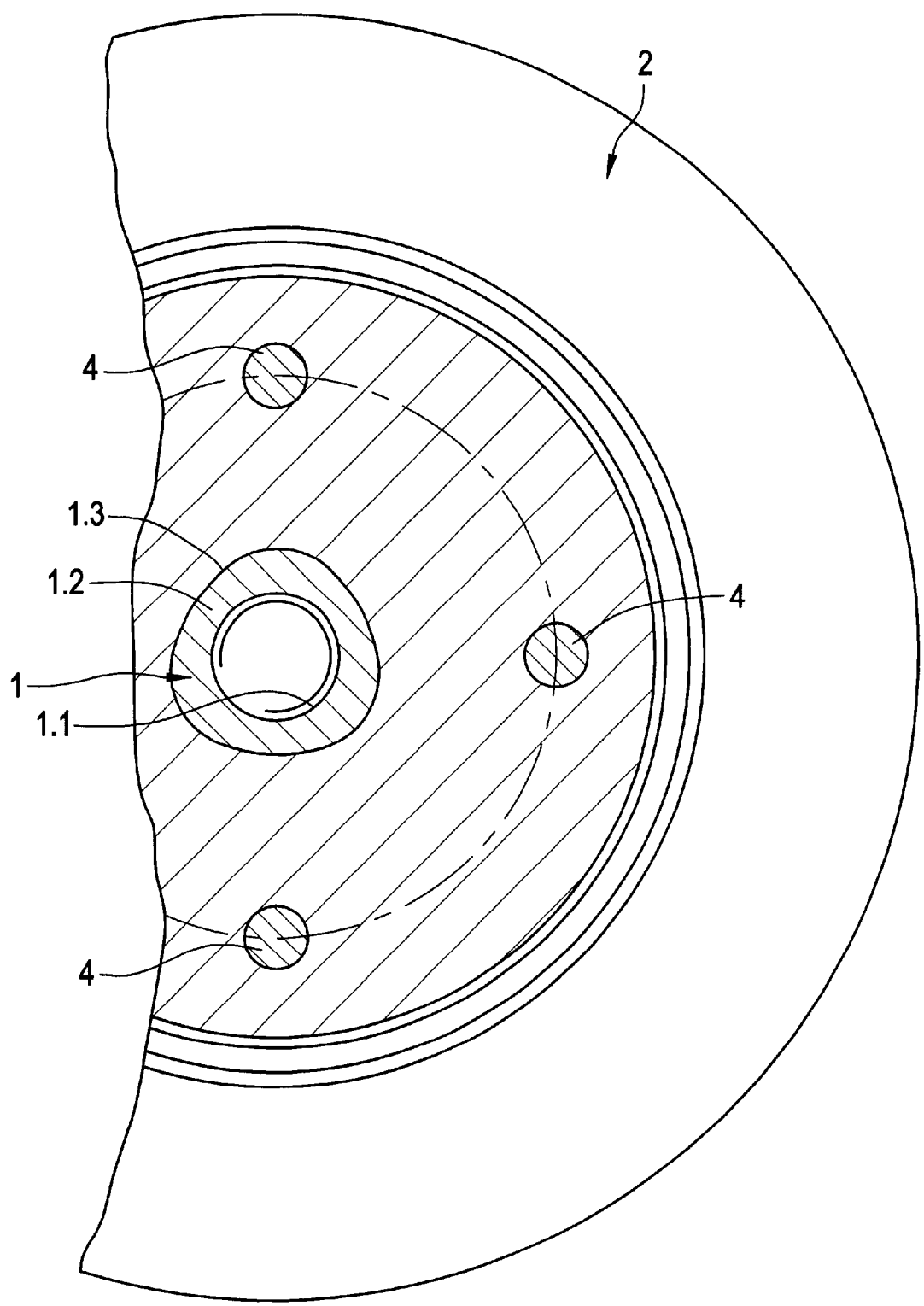
FIG. 2 a cross-section according to the cutting line II—II in FIG. 1.
Figure 3:
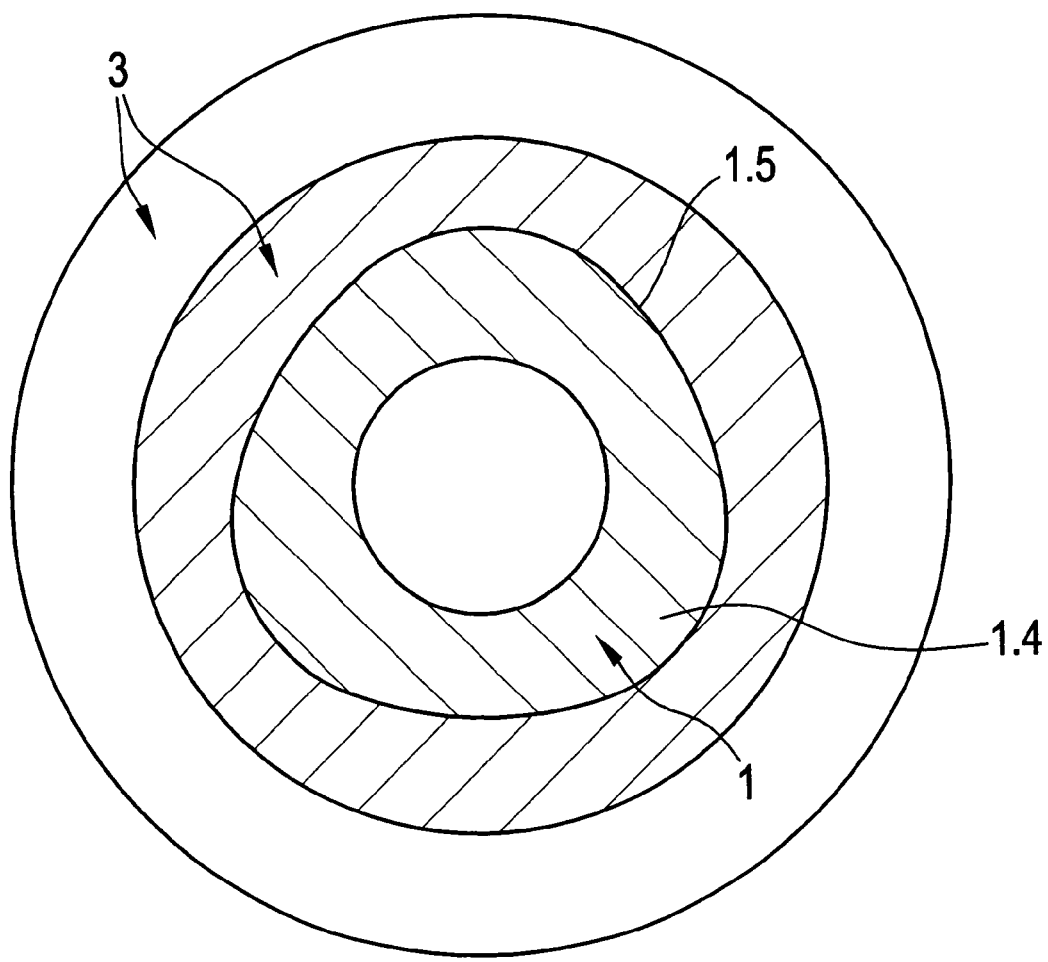
FIG. 3 a cross-section according to the cutting line III—III in FIG 1.
Figure 4:
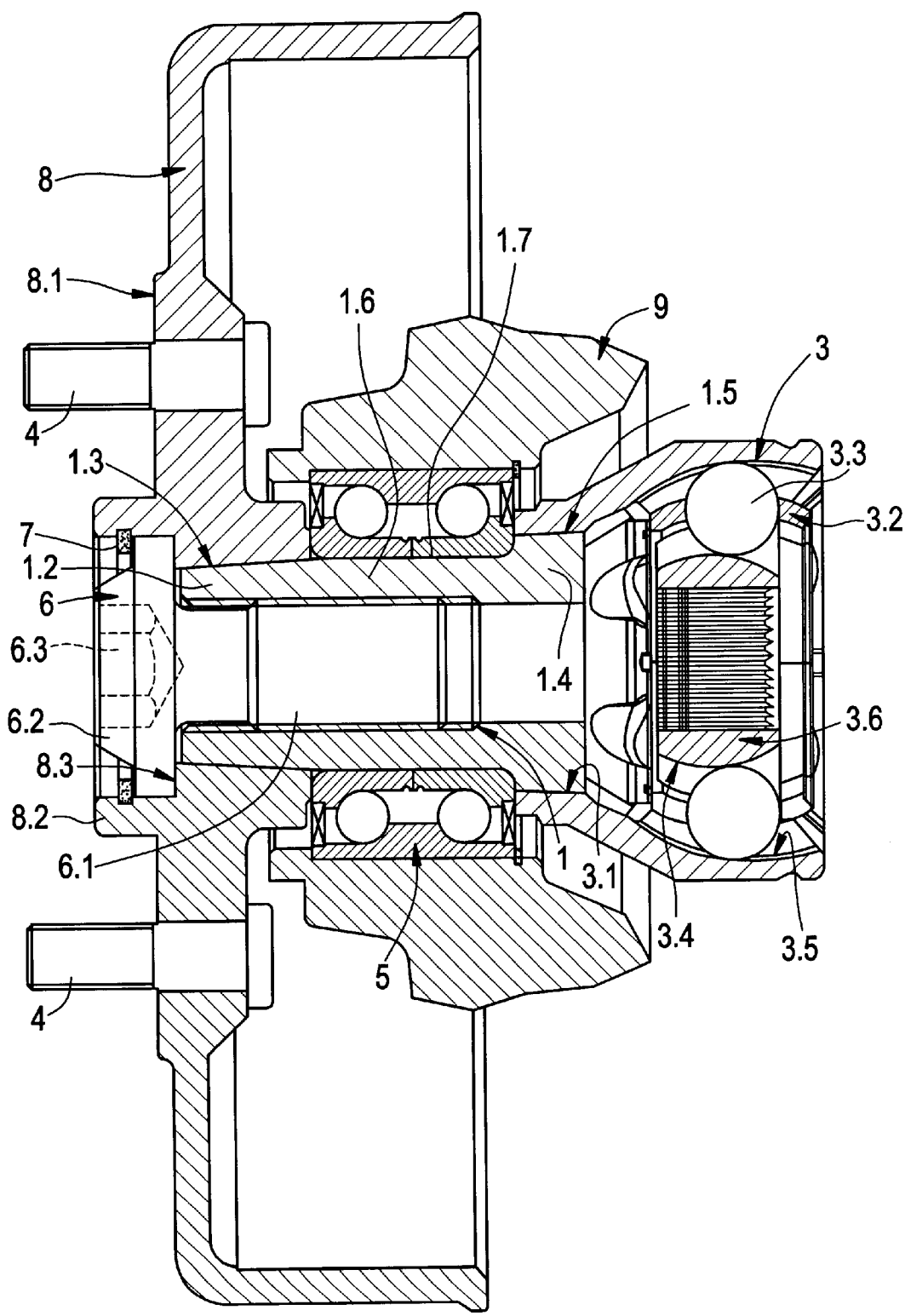
FIG. 4 the longitudinal section of FIG 1 where the brake member is a brake drum.

The exemplified embodiment in the illustration is restricted to a single wheel suspension provided with a constant-velocity joint, although the type of wheel suspension illustrated can be used for all wheel suspensions of driven wheels.

In the exemplified embodiment according to FIGS. 1 to 4 only the relevant parts of this single wheel suspension for a driven wheel of a motor vehicle are illustrated, that is to say a wheel drive shaft 1 which at its end on the wheel side is connected in non-slipping manner to a brake member constructed in the exemplified embodiment as a brake disk 2 and at its other end is connected again in non-slipping manner to a ball cup 3 of a constant-velocity joint. The constant-velocity joint further comprises a ball star 3.6 which is arranged in non-slipping manner on the drive shaft and works together in non-slipping manner with the ball cup 3 via balls 3.3 arranged in a ball cage 3.2, the balls 3.3 in the ball cup 3 on the one hand and on the ball star 3.6 on the other hand running either on linear or on arched ball races 3.4 and 3.5 depending on whether the constant-velocity joint is one with the possibility of axial displacement or is a homocenetic fixed joint. Such constant-velocity joints are employed both for the unsteered rear wheels as well as for the steered front wheels of motor vehicles.

The driving torque transmitted by the drive shaft, which is not illustrated, to the ball cup 3 is passed on via the wheel drive shaft 1 to a wheel which can be fastened detachably to a contact surface 2.1 of the brake disk 2 by means of wheel bolts. The wheel which is not illustrated in the drawing is centered in a central bore constructed in its wheel pan by means of a centering flange 2.2 on the brake disk 2. The brake disk 2 in the exemplified embodiment illustrated is a ventilated brake disk.

The wheel drive shaft 1 which transmits the drive torque from the ball cup 3 to the brake disk 2 is illustrated in the exemplified embodiment as a separate component, but it can also be constructed in one piece with the ball cup 3. At the end on the wheel side the wheel drive shaft 1 is constructed with a shaft section 1.2 having a polygonal outer contour 1.3. This polygonal outer contour 1.3 of the shaft section 1.2 is best seen in the cross-section of FIG. 2. The brake disk 2 is provided with a corresponding polygonal recess so that in the assembled state according to FIG. 1 a non-slipping, torque-transmitting connection is produced between the wheel drive shaft 1 and the brake disk 2. Instead of the polygon reminiscent of a rounded equilateral triangle shown in FIG. 2, any other polygonal contour shape can be chosen.

The non-slipping connection between the ball cup 3 and the end on the drive side of the wheel drive shaft 1 also ensues via a polygonal outer contour 1.5 which is constructed on the lateral area of an end flange 1.4. This polygonal outer contour 1.5 of the end flange 1.4 of the wheel drive shaft 1 which can be seen in FIG. 3 matches a corresponding polygonal recess 3.1 in the base of the ball cup 3 so that at this point also a non-slipping connection between the wheel drive shaft 1 and the ball cup 3 is produced.

As can be seen in the exemplified embodiment the polygonal outer contour 1.3 of the shaft section 1.2 and the polygonal outer contour 1.5 of the end flange 1.4 are of slightly conical construction in the axial direction so that by applying an axial force a connection between the wheel drive shaft 1 on the one hand and the brake disk 2 or the ball cup 3 on the other hand which is free of play in both the axial and radial directions can be achieved in simple manner.

Constructed between the end flange 1.4 and the shaft section 1.2 of the wheel drive shaft is a shaft section 1.6 with a cylindrical outer surface 1.7 which serves as the seat for the inner ring of a roller bearing 5 which in the exemplified embodiment is illustrated as a double ball bearing. The inner ring of this roller bearing 5 rests against the brake disk 2 between the end flange 1.4 of the wheel drive shaft 1 and a contact surface. Through the outer ring of this roller bearing 5 the wheel drive shaft 1 and with it the brake disk 2 is mounted in rotatable manner on a guide rod which is not illustrated and is connected pivotably to the frame or structure of the motor vehicle. Insofar as the single wheel suspension is a suspension for a steered front wheel the outer ring of the roller bearing 5 is located in a steering knuckle 9 which for its part is mounted on a guide rod of the motor vehicle so as to be pivotable about a swiveling axis.

In order to secure the position of the parts shown in FIG. 1 the wheel drive shaft 1 is provided with an inner thread 1.1 in which the threaded body 6.1 of a bolt 6 engages the bolt head 6.2 of which rests against an annular contact surface 2.3 which according to FIG. 1 is constructed inside the centring flange 2.2 on the brake disk 2. It can further be seen from FIG. 1 that in the exemplified embodiment the bolt head 6.2 is provided with a key surface constructed as an inset hexagon 6.3 and is held in the brake disk 2 so as to be rotatable but substantially undisplaceable axially by means of a retaining member constructed as a snap ring 7.

As a result of this construction it is possible to pull the brake disk 2, if necessary together with the roller bearing 5, on to the wheel drive shaft 1 solely with the aid of the bolt 6 and in so doing simultaneously to establish the connection between the wheel drive shaft 1 on the one hand and the brake disk 2 as well as the ball cup 3 on the other hand which is free of play in the axial and radial directions. Pulling the brake disk 2 away from the wheel drive shaft 1 is also possible using only the bolt 6 since when this is screwed out of the inner thread 1.1 of the wheel drive shaft 1 via the snap ring 7 it carries the brake disk 2 along with it.

What is claimed is:

1. A wheel suspension assembly for a motor vehicle comprising:

driven wheels;

a brake member having a contact surface;

a suspension connected pivotably to a frame or structure of the vehicle; and a drive shaft;

wherein the wheels are fastened detachably by wheel bolts to the contact surface, the brake member is mounted rotatably by a roller bearing on the suspension, an end of the drive shaft on a wheel side includes a shaft section having a polygonal outer contour connected directly to the brake member, and the drive shaft further includes a cylindrical shaft section adjoining the polygonal shaft section, the cylindrical shaft section serving as a seat for the roller bearing.

2. The wheel suspension according to claim 1, for single wheel suspensions wherein the brake member is connected to the drive shaft by means of a constant-velocity joint comprising a ball cup, ball star and balls arranged in a ball cage, an end of the ball cup on a wheel side is connected by the shaft section having the polygonal outer contour directly to the brake member, the seat for the roller bearing being between the polygonal shaft section and the ball cup.

3. The wheel suspension assembly according to claim 2, wherein the drive shaft is designed as a separate component and includes an end flange having a polygonal outer contour connected to the ball cup which is provided in a base with a recess corresponding to the polygonal outer contour of the end flange.

4. The wheel suspension assembly according to claim 1, wherein the polygonal outer contour of the shaft section and/or of the end flange is of conical construction in an axial direction.

5. The wheel suspension assembly according to claim 1, wherein the drive shaft is provided with a thread for a fastening member fixing the brake member on the drive shaft in an axial direction.

6. The wheel suspension assembly according to claim 5, wherein the thread comprises an inner thread for a threaded body of the fastening member comprising a bolt, a bolt head of which rests against an annular contact surface of the brake member.

7. The wheel suspension assembly according to claim 5, wherein an inner ring of the roller bearing is simultaneously clamped by the fastening member between an end flange of the drive shaft and the contact surface of the brake member.

8. The wheel suspension assembly according to claim 6, wherein the bolt head is provided with an insert key surface and is held in the brake member rotatably but substantially undisplaceable axially by means of a retaining member.

9. The wheel suspension assembly according to claim 2, wherein the ball cup and the ball star of the constant-velocity joint comprise arched ball races for the balls and an outer ring of the roller bearing is fixed in a steering knuckle which is mounted on a guide rod and is pivotable by a steering mechanism.

10. The wheel suspension assembly according to claim 1, wherein the brake member comprises a brake disk.

11. The wheel suspension assembly according to claim 1, wherein the brake member comprises a brake drum.

\* \* \* \* \*